(12) United States Patent
Saurabh et al.

(10) Patent No.: US 12,164,512 B2
(45) Date of Patent: Dec. 10, 2024

(54) AUTOMATIC PARTITIONING

(71) Applicant: Sumo Logic, Inc., Redwood City, CA (US)

(72) Inventors: Kumar Saurabh, Sunnyvale, CA (US); Christian Friedrich Beedgen, Mountain View, CA (US)

(73) Assignee: Sumo Logic, Inc., Redwood City, CA (US)

( * ) Notice: Subject to any disclaimer, the term of this patent is extended or adjusted under 35 U.S.C. 154(b) by 0 days.

(21) Appl. No.: 17/806,381

(22) Filed: Jun. 10, 2022

(65) Prior Publication Data

US 2022/0300496 A1 Sep. 22, 2022

Related U.S. Application Data

(63) Continuation of application No. 15/293,007, filed on Oct. 13, 2016, now Pat. No. 11,392,582.

(60) Provisional application No. 62/367,033, filed on Jul. 26, 2016, provisional application No. 62/265,942, filed on Dec. 10, 2015, provisional application No. 62/241,932, filed on Oct. 15, 2015.

(51) Int. Cl.
*G06F 16/242* (2019.01)
*G06F 16/2453* (2019.01)
*G06F 16/31* (2019.01)
*G06F 16/33* (2019.01)

(52) U.S. Cl.
CPC .... *G06F 16/2425* (2019.01); *G06F 16/24534* (2019.01); *G06F 16/313* (2019.01); *G06F 16/3334* (2019.01)

(58) Field of Classification Search
CPC .. G06F 16/951; G06F 11/3476; G06F 16/278; G06F 16/355; G06F 16/313; G06F 11/3072
See application file for complete search history.

(56) References Cited

U.S. PATENT DOCUMENTS

| 6,006,225 | A | 12/1999 | Bowman et al. |
| 6,393,415 | B1 | 5/2002 | Getchius et al. |
| 6,493,699 | B2* | 12/2002 | Colby ................. G06F 16/22 |
| 7,702,614 | B1 | 4/2010 | Shah et al. |
| 7,890,516 | B2 | 2/2011 | Zarzar et al. |
| 8,103,689 | B2 | 1/2012 | Gupta et al. |
| 8,117,215 | B2 | 2/2012 | Forman et al. |
| 8,145,623 | B1 | 3/2012 | Mehta et al. |
| 8,150,841 | B2 | 4/2012 | Meyers et al. |

(Continued)

FOREIGN PATENT DOCUMENTS

| EP | 3362886 A1 | 8/2018 |
| WO | WO-2017/066698 A1 | 4/2017 |

OTHER PUBLICATIONS

"U.S. Appl. No. 15/293,007, Examiner Interview Summary mailed Apr. 17, 2019", 4 pgs.

(Continued)

*Primary Examiner* — Brittany N Allen
(74) *Attorney, Agent, or Firm* — Schwegman Lundberg & Woessner, P.A.

(57) ABSTRACT

Automatic partitioning is disclosed. A set of previously run queries is obtained. The set of previously run queries is analyzed to determine one or more query fragments from the set of previously run queries. One or more partitions are generated at least in part by using the obtained query fragments.

12 Claims, 13 Drawing Sheets

(56) References Cited

U.S. PATENT DOCUMENTS

| | | | |
|---|---|---|---|
| 8,166,045 | B1 | 4/2012 | Mazumdar et al. |
| 8,326,825 | B2 | 12/2012 | Nehme et al. |
| 9,330,083 | B2 | 5/2016 | Tseng et al. |
| 9,501,506 | B1 | 11/2016 | Fontoura et al. |
| 9,626,414 | B2 | 4/2017 | Kanjirathinkal et al. |
| 9,727,906 | B1 | 8/2017 | Sarmento et al. |
| 10,891,297 | B2 | 1/2021 | Zhu et al. |
| 11,392,582 | B2 | 7/2022 | Saurabh et al. |
| 2003/0004932 | A1 | 1/2003 | Chow et al. |
| 2003/0200198 | A1 | 10/2003 | Chandrasekar et al. |
| 2004/0230577 | A1 | 11/2004 | Kawatani |
| 2006/0018551 | A1 | 1/2006 | Patterson |
| 2006/0041560 | A1 | 2/2006 | Forman et al. |
| 2006/0106792 | A1 | 5/2006 | Patterson |
| 2007/0283194 | A1* | 12/2007 | Villella ............... G06F 11/3476 714/E11.204 |
| 2011/0184915 | A1 | 7/2011 | Wu et al. |
| 2012/0278341 | A1 | 11/2012 | Ogilvy et al. |
| 2013/0124525 | A1 | 5/2013 | Anderson et al. |
| 2014/0279892 | A1 | 9/2014 | Bourbonnais et al. |
| 2014/0351203 | A1 | 11/2014 | Kunnatur et al. |
| 2015/0088898 | A1 | 3/2015 | Branch et al. |
| 2015/0220605 | A1* | 8/2015 | Syed ....................... G06F 17/40 707/776 |
| 2015/0261840 | A1* | 9/2015 | Clifford ................ G06F 16/951 707/807 |
| 2015/0372855 | A1 | 12/2015 | Kushmerick et al. |
| 2017/0083566 | A1* | 3/2017 | Das ................. G06F 16/24554 |
| 2017/0132276 | A1 | 5/2017 | Saurabh et al. |
| 2018/0329999 | A1 | 11/2018 | Kale et al. |

OTHER PUBLICATIONS

"U.S. Appl. No. 15/293,007, Examiner Interview Summary mailed May 24, 2021", 2 pgs.
"U.S. Appl. No. 15/293,007, Examiner Interview Summary mailed Jul. 27, 2020", 3 pgs.
"U.S. Appl. No. 15/293,007, Examiner Interview Summary mailed Sep. 10, 2019", 3 pgs.
"U.S. Appl. No. 15/293,007, Examiner Interview Summary mailed Dec. 15, 2020", 3 pgs.
"U.S. Appl. No. 15/293,007, Final Office Action mailed Jun. 28, 2021", 17 pgs.
"U.S. Appl. No. 15/293,007, Final Office Action mailed Jul. 12, 2019", 21 pgs.
"U.S. Appl. No. 15/293,007, Final Office Action mailed Sep. 28, 2020", 19 pgs.
"U.S. Appl. No. 15/293,007, Non Final Office Action mailed Feb. 10, 2021", 17 pgs.
"U.S. Appl. No. 15/293,007, Non Final Office Action mailed Apr. 20, 2020", 22 pgs.
"U.S. Appl. No. 15/293,007, Non Final Office Action mailed Oct. 26, 2021", 24 pgs.
"U.S. Appl. No. 15/293,007, Non Final Office Action mailed Dec. 26, 2018", 38 pgs.
"U.S. Appl. No. 15/293,007, Notice of Allowance mailed Mar. 16, 2022", 14 pgs.
"U.S. Appl. No. 15/293,007, Response filed Jan. 25, 2022 to Non Final Office Action mailed Oct. 26, 2021", 13 pgs.
"U.S. Appl. No. 15/293,007, Response filed Apr. 3, 2019 to Non Final Office Action mailed Dec. 26, 2018", 5 pgs.
"U.S. Appl. No. 15/293,007, Response filed May 10, 2021 to Non Final Office Action mailed Feb. 10, 2021", 6 pgs.
"U.S. Appl. No. 15/293,007, Response filed Jul. 15, 2020 to Non Final Office Action mailed Apr. 20, 2020", 8 pgs.
"U.S. Appl. No. 15/293,007, Response filed Sep. 17, 2019 to Final Office Action mailed Jul. 12, 2019", 7 pgs.
"U.S. Appl. No. 15/293,007, Response filed Sep. 20, 2021 to Final Office Action mailed Jun. 28, 2021", 13 pgs.
"U.S. Appl. No. 15/293,007, Response filed Dec. 10, 2020 to Final Office Action mailed Sep. 28, 2020", 7 pgs.
"European Application Serial No. 16856361.7, Communication Pursuant to Article 94(3) EPC mailed Apr. 16, 2020", 7 pgs.
"European Application Serial No. 16856361.7, Communication Pursuant to Article 94(3) EPC mailed Oct. 19, 2020", 5 pgs.
"European Application Serial No. 16856361.7, Extended European Search Report mailed Mar. 27, 2019", 9 pgs.
"European Application Serial No. 16856361.7, Response filed Feb. 2, 2021 to Communication Pursuant to Article 94(3) EPC mailed Oct. 19, 2020", 10 pgs.
"European Application Serial No. 16856361.7, Response filed Apr. 11, 2022 to Summons to Attend Oral Proceedings mailed Oct. 5, 2021", 16 pgs.
"European Application Serial No. 16856361.7, Response filed Aug. 5, 2020 to Communication pursuant to Article 94(3) EPC mailed Apr. 16, 2020", 11 pgs.
"European Application Serial No. 16856361.7, Response filed Oct. 3, 2019 to Extended European Search Report mailed Mar. 27, 2019", 11 pgs.
"European Application Serial No. 16856361.7, Response to Communication pursuant to Rules 161(1) and 162 EPC filed Nov. 14, 2018", 7 pgs.
"European Application Serial No. 16856361.7, Summons to Attend Oral Proceedings mailed Oct. 5, 2021", 8 pgs.
"International Application Serial No. PCT/US2016/057211, International Preliminary Report on Patentability mailed Apr. 26, 2018", 8 pgs.
"International Application Serial No. PCT/US2016/057211, International Search Report mailed Jan. 10, 2017", 3 pgs.
"International Application Serial No. PCT/US2016/057211, Written Opinion mailed Jan. 10, 2017", 6 pgs.
Abdullah, U, "Analysis of effectiveness of apriori algorithm in medical billing data mining", 4th International Conference on Emerging Technologies, (2008), 327-331.
Christensen, Robert, et al., "Adaptive log compression for massive log data", In Proceedings of the 2013 ACM SIGMOD International Conference on Management of Data (SIGMOD'13), Association for Computing Machinery, NewYork, NY, USA, (2013), 1283-1284.
Makanju, Adetokunbo A. O, et al., "Clustering event logs using iterative partitioning", In Proceedings of the 15th ACM SIGKDD International Conference on Knowledge Discovery and Data Mining (KDD '09)., Association for Computing Machinery, New York, NY USA, (2009), 1255-1264.
Rahmani, Ali, et al., "Employing Frequent Pattern Mining for Finding Correlations between Tables in Relational Databases", IEEE Eighth International Conference on Information Technology: New Generations (ITNG), (Apr. 2011), 547-552.
Silvestri, F, "Mining Query Logs: Turning Search Usage Data into Knowledge", Foundation and Trends in Information Retrieval, vol. 4, Nos. 1-2, (2010), 1-174.

* cited by examiner

702 — • "method not allowed" =>
"method", "not", "allowed"

704 {
• _sourcecategory=lsw_qa =>
leave it alone
• Or not =>
_sourcecategory=lsw_*
}

FIG. 7

| # | querytype | _speedup_pct_25 | _count |
|---|-----------|-----------------|--------|
| 1 | error | 979.05902 | 25 |
| 2 | non-error | 174.92711 | 311 |

FIG. 8

- Total number of queries = 42,922
- Total cost of queries run = 1,420,857,119,685
- Total number of interactive queries = 318
- Total cost of queries run = 173,333,452,613
- Interactive Queries
    - Percentage Of Cost=12.2%

FIG. 9

High Selectivity Search Fragments - likely to repeat

| Cost | PercentageCost | timesQueryRan | inverseSelectivity | interactiveCostPercentage | batchCostPercentage | rangeDays | |
|---|---|---|---|---|---|---|---|
| Cost=2713665914 | PercentageCost= 11.88 | timesQueryRan= 1 | inverseSelectivity= 1 | 84143 interactiveCostPercentage = 0.00, | batchCostPercentage=100.00 | rangeDays= | 7.00 "critical or wa |
| Cost=2713665914 | PercentageCost= 11.88 | timesQueryRan= 1 | inverseSelectivity= 1 | 84143 interactiveCostPercentage = 0.00, | batchCostPercentage=100.00 | rangeDays= | 7.00 _sourcecategory; |
| Cost=6655313880 | PercentageCost= 2.91 | timesQueryRan= 1 | inverseSelectivity= 1 | 198665 interactiveCostPercentage = 100.00, | batchCostPercentage= 0.00 | rangeDays= | 1.00 (height or skin |
| Cost=6655313880 | PercentageCost= 2.91 | timesQueryRan= 1 | inverseSelectivity= 1 | 198665 interactiveCostPercentage = 100.00, | batchCostPercentage= 0.00 | rangeDays= | 1.00 _sourcename=/ho |
| Cost=6425263878 | PercentageCost= 2.81 | timesQueryRan= 1 | inverseSelectivity= 1 | 6425263878 interactiveCostPercentage = 100.00, | batchCostPercentage= 0.00 | rangeDays= | 1.00 user |
| Cost=3718574370 | PercentageCost= 1.63 | timesQueryRan= 1 | inverseSelectivity= 4 | 3718574370 interactiveCostPercentage = 100.00, | batchCostPercentage= 0.00 | rangeDays= | 0.67 _source="fideli |
| Cost=3718574370 | PercentageCost= 1.63 | timesQueryRan= 1 | inverseSelectivity= 4 | 3718574370 interactiveCostPercentage = 100.00, | batchCostPercentage= 0.00 | rangeDays= | 0.67 _source="fireey |
| Cost=2977595498 | PercentageCost= 1.30 | timesQueryRan= 1 | inverseSelectivity= 2 | 2977595498 interactiveCostPercentage = 100.00, | batchCostPercentage= 0.00 | rangeDays= | 3.01 "has already be |
| Cost=2977595498 | PercentageCost= 1.30 | timesQueryRan= 1 | inverseSelectivity= 2 | 2977595498 interactiveCostPercentage = 100.00, | batchCostPercentage= 0.00 | rangeDays= | 3.01 _sourcename=/ho |
| Cost=1968916760 | PercentageCost= 0.86 | timesQueryRan= 1 | inverseSelectivity= 3 | 44747 interactiveCostPercentage = 100.00, | batchCostPercentage= 0.00 | rangeDays= | 7.00 _sourcename=/ho |
| Cost=1676672570 | PercentageCost= 0.73 | timesQueryRan= 1 | inverseSelectivity= 1 | 1676672570 interactiveCostPercentage = 100.00, | batchCostPercentage= 0.00 | rangeDays= | 3.00 "i forgot to re |
| Cost=1057539129 | PercentageCost= 0.46 | timesQueryRan= 1 | inverseSelectivity= 1 | 13823 interactiveCostPercentage = 100.00, | batchCostPercentage= 0.00 | rangeDays= | 1.00 39642593 |
| Cost=836413973 | PercentageCost= 0.37 | timesQueryRan= 1 | inverseSelectivity= 53 | 836413973 interactiveCostPercentage = 100.00, | batchCostPercentage= 0.00 | rangeDays= | 0.55 _sourcename=/va |
| Cost=836413973 | PercentageCost= 0.37 | timesQueryRan= 1 | inverseSelectivity= 53 | 836413973 interactiveCostPercentage = 100.00, | batchCostPercentage= 0.00 | rangeDays= | 0.55 _sourcehost=es* |
| Cost=767023498 | PercentageCost= 0.34 | timesQueryRan= 1 | inverseSelectivity= 1 | 767023498 interactiveCostPercentage = 100.00, | batchCostPercentage= 0.00 | rangeDays= | 7.00 "move size is" |
| Cost=605984070 | PercentageCost= 0.27 | timesQueryRan= 1 | inverseSelectivity= 4 | 6807 interactiveCostPercentage = 100.00, | batchCostPercentage= 0.00 | rangeDays= | 6.96 gopalakrishnan |
| Cost=589069632 | PercentageCost= 0.26 | timesQueryRan= 1 | inverseSelectivity= 45 | 589069632 interactiveCostPercentage = 100.00, | batchCostPercentage= 0.00 | rangeDays= | 1.88 " " |
| Cost=577856036 | PercentageCost= 0.25 | timesQueryRan= 1 | inverseSelectivity= 49 | 2601 interactiveCostPercentage = 100.00, | batchCostPercentage= 0.00 | rangeDays= | 0.89 configname=*.pr |
| Cost=558049676 | PercentageCost= 0.24 | timesQueryRan= 1 | inverseSelectivity= 37 | 2518 interactiveCostPercentage = 100.00, | batchCostPercentage= 0.00 | rangeDays= | 0.39 _sourcename=*/g |
| Cost=558049676 | PercentageCost= 0.24 | timesQueryRan= 1 | inverseSelectivity= 37 | 2518 interactiveCostPercentage = 100.00, | batchCostPercentage= 0.00 | rangeDays= | 0.39 gc |
| Cost=558049676 | PercentageCost= 0.24 | timesQueryRan= 1 | inverseSelectivity= 37 | 2518 interactiveCostPercentage = 100.00, | batchCostPercentage= 0.00 | rangeDays= | 0.39 full |
| Cost=319652918 | PercentageCost= 0.14 | timesQueryRan= 1 | inverseSelectivity= 2 | 3148 interactiveCostPercentage = 100.00, | batchCostPercentage= 0.00 | rangeDays= | 4.00 "method not all |
| Cost=233362875 | PercentageCost= 0.10 | timesQueryRan= 1 | inverseSelectivity= 3 | 233362875 interactiveCostPercentage = 0.00, | batchCostPercentage=100.00 | rangeDays= | 1.50 (classnotfounde |
| Cost=228625287 | PercentageCost= 0.10 | timesQueryRan= 1 | inverseSelectivity= 1 | 228625287 interactiveCostPercentage = 0.00, | batchCostPercentage=100.00 | rangeDays= | 1.00 _sourcecategory; |

FIG. 11

| Cost | PercentageCost | timesQueryRan | inverseSelectivity | interactiveCostPercentage | batchCostPercentage | rangeDays | value | text |
|---|---|---|---|---|---|---|---|---|
| Cost=228625287 | PercentageCost= 0.10 | timesQueryRan= | 1 inverseSelectivity= | 228625287 interactiveCostPercentage = | 0.00, batchCostPercentage=100.00 | rangeDays= | 1.00 | clienterror |
| Cost=225600524 | PercentageCost= 0.10 | timesQueryRan= | 2 inverseSelectivity= | 225600524 interactiveCostPercentage = | 0.00, batchCostPercentage=100.00 | rangeDays= | 2.00 | ("pdbsoaphandle |
| Cost=204683862 | PercentageCost= 0.09 | timesQueryRan= | 15 inverseSelectivity= | 204683862 interactiveCostPercentage = | 0.00, batchCostPercentage=100.00 | rangeDays= | 0.63 | (((((_sourceca |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | the |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | : |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | error* |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | "instagram" |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | "error_message" |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | access_token |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | is |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | invalid. |
| Cost=196356544 | PercentageCost= 0.09 | timesQueryRan= | 15 inverseSelectivity= | 196356544 interactiveCostPercentage = | 0.00, batchCostPercentage=100.00 | rangeDays= | 0.63 | provided |
| Cost=145485378 | PercentageCost= 0.06 | timesQueryRan= | 48 inverseSelectivity= | 145485378 interactiveCostPercentage = | 0.00, batchCostPercentage=100.00 | rangeDays= | 0.50 | "(#4) applicati |
| Cost=128071948 | PercentageCost= 0.06 | timesQueryRan= | 14 inverseSelectivity= | 64034 interactiveCostPercentage = | 0.00, batchCostPercentage=100.00 | rangeDays= | 0.58 | " promiscuous mo |
| Cost=122421999 | PercentageCost= 0.05 | timesQueryRan= | 13 inverseSelectivity= | 122421999 interactiveCostPercentage = | 0.00, batchCostPercentage=100.00 | rangeDays= | 0.54 | flash |
| Cost=122421999 | PercentageCost= 0.05 | timesQueryRan= | 13 inverseSelectivity= | 122421999 interactiveCostPercentage = | 0.00, batchCostPercentage=100.00 | rangeDays= | 0.54 | cve-2014-4671 |
| Cost=118181523 | PercentageCost= 0.05 | timesQueryRan= | 1 inverseSelectivity= | 118181523 interactiveCostPercentage = | 0.00, batchCostPercentage=100.00 | rangeDays= | 1.00 | _sourcename=*/ho |
| Cost=117404975 | PercentageCost= 0.05 | timesQueryRan= | 55 inverseSelectivity= | 117404975 interactiveCostPercentage = | 0.00, batchCostPercentage=100.00 | rangeDays= | 0.57 | "queued play th |
| Cost=110708537 | PercentageCost= 0.05 | timesQueryRan= | 1 inverseSelectivity= | 13023 interactiveCostPercentage = | 100.00, batchCostPercentage= 0.00 | rangeDays= | 0.60 | "10a3b36e" |
| Cost=110708537 | PercentageCost= 0.05 | timesQueryRan= | 1 inverseSelectivity= | 13023 interactiveCostPercentage = | 100.00, batchCostPercentage= 0.00 | rangeDays= | 0.60 | _sourcename=*op |
| Cost=107419001 | PercentageCost= 0.05 | timesQueryRan= | 1 inverseSelectivity= | 107419001 interactiveCostPercentage = | 0.00, batchCostPercentage=100.00 | rangeDays= | 1.00 | _sourcename=/ho |
| Cost=103949655 | PercentageCost= 0.05 | timesQueryRan= | 11 inverseSelectivity= | 103949655 interactiveCostPercentage = | 0.00, batchCostPercentage=100.00 | rangeDays= | 0.46 | "unexpected end |
| Cost=90179944 | PercentageCost= 0.04 | timesQueryRan= | 725 inverseSelectivity= | 90179944 interactiveCostPercentage = | 0.00, batchCostPercentage=100.00 | rangeDays= | 0.51 | tbila_message_v |

AUTOMATIC PARTITIONING

CROSS-REFERENCE TO RELATED APPLICATIONS

This application is a Continuation Application under 35 USC § 120 of U.S. patent application Ser. No. 15/293,007, entitled "Automatic Partitioning," filed on Oct. 13, 2016, which claims the benefit of U.S. Provisional Patent No. 62/241,932, entitled "Auto Partitioning," filed Oct. 15, 2015; U.S. Provisional Patent No. 62/265,942, entitled "Auto Partitioning," filed Dec. 10, 2015; and U.S. Provisional Patent No. 62/367,033, entitled "Automatic Partitioning," filed Jul. 26, 2016, all of which are incorporated herein by reference in their entirety.

BACKGROUND

Business and other entities are increasingly interested in capturing data associated with their computer networks for information technology (IT) security, IT operations, compliance, and other reasons. Unfortunately, searching through that data can be difficult, expensive, and ineffective. One reason is that indexes used to store the data are typically built manually, which can result in inefficiencies where, for example, large amounts of data are scanned in order to satisfy a query.

BRIEF DESCRIPTION OF THE DRAWINGS

Various embodiments of the invention are disclosed in the following detailed description and the accompanying drawings.

FIG. 7 illustrates an example embodiment of fragment generation.

FIG. 8 illustrates an embodiment of a query speedup.

FIG. 9 illustrates an embodiment of query analysis results.

FIG. 11 illustrates an example embodiment of a table indicating selectivity of search fragments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
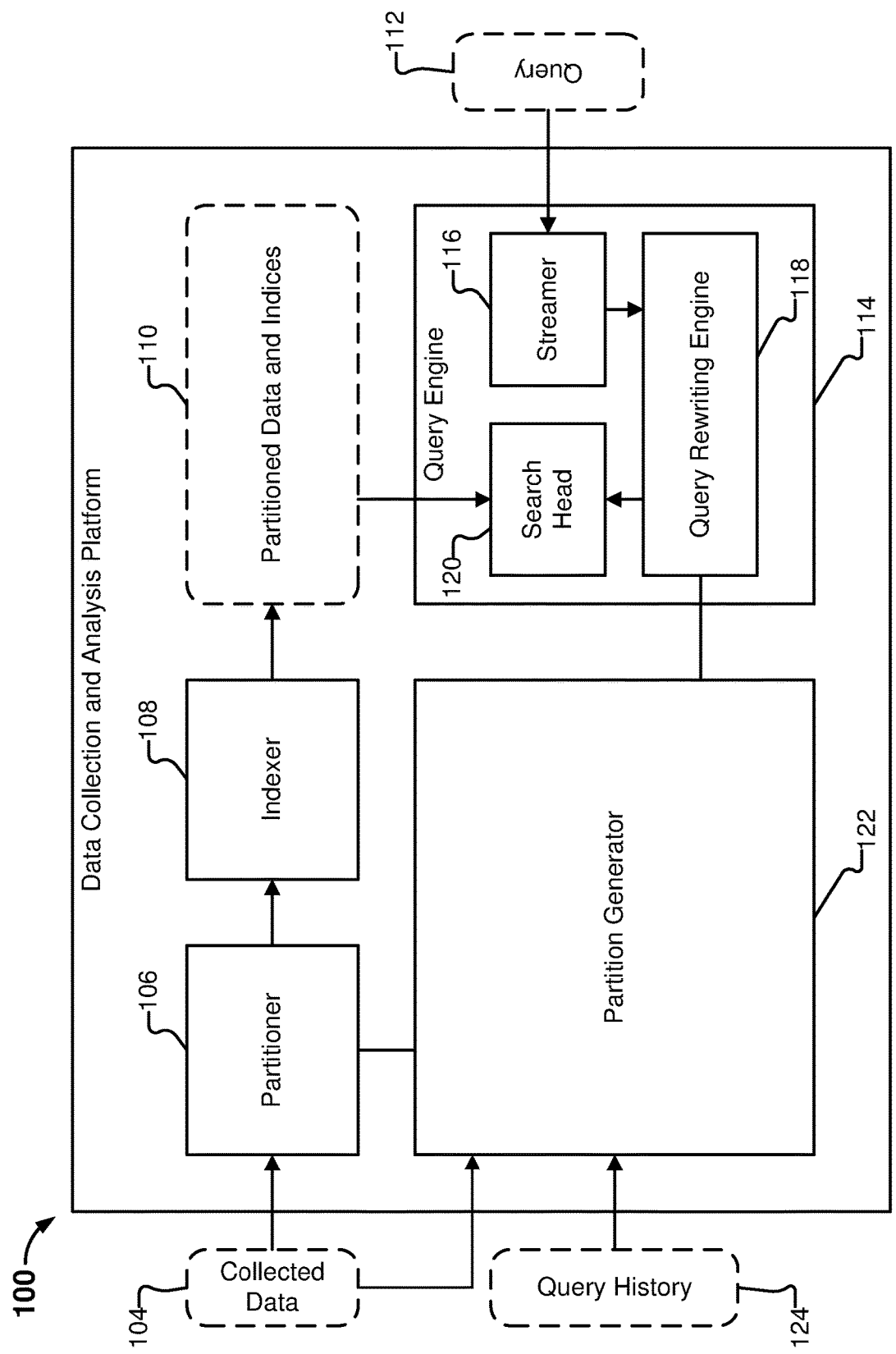
FIG. 1 illustrates an example environment in which auto-partitioning is performed.

FIG. 1 illustrates an example environment in which auto-partitioning is performed. In the example shown, a customer provides data (104) to a data collection and analysis platform 100 (also referred to herein as "platform" 100) via a network such as the Internet. Other elements may also provide data to platform 100, such as software-as-a-service (SAAS) providers, in various embodiments. As will be described in more detail below, platform 100 is configured to collect, analyze, and facilitate querying of the data received from customers.

While example embodiments involving log data are described below, the auto-partitioning techniques described herein can variously be adapted to accommodate any type of data, as applicable.

In the example shown in FIG. 1, log data (104) collected from the customer is divided into various partitions using partitioner 106. For example, a partition (also referred to herein as a "bucket") is associated with a condition. If data matches the condition, then it is placed in the partition. As one example, suppose that an "error" partition is associated with a condition that any log data that includes the term "error" is to be bucketed in that partition. A collected log data event "error out of memory exception" would satisfy the condition and be placed in the "error" partition. In the example shown in FIG. 1, the partitioned data is indexed using indexer 108 (e.g., to facilitate faster querying). The indexed and partitioned data is stored to index 110.

In the example shown in FIG. 1, the data collection and analysis platform is also configured to facilitate querying of collected data, for example, by users associated with the customers of the platform. The queries can include interactive queries (e.g., queries run by users, for example, using a terminal) that can be provided via a front end (e.g., web UI). Queries can also include batch queries (e.g., queries run in the background), which can be provided, for example, via an application programming interface (API).

Query engine 114 is configured to facilitate querying of the partitioned and indexed log data. In the example shown in FIG. 1, query engine 114 includes streamer 116, query rewriting engine 118, and search head 120.

Streamer 116 is configured to receive queries from users (e.g., via a UI or other front end, as applicable). Queries (112) can be received from multiple users, where streamer 116 is configured to manage the processing of the queries to ensure that the appropriate results are returned for their corresponding query.

Query rewriting engine 118 is configured to rewrite queries (e.g., on the fly/dynamically) and transform them into different queries that can access the indexed/partitioned data. In some embodiments, the queries are rewritten based on the definition of the partition scheme according to which collected data has been indexed. For example, suppose that a query for log data specifying "error out of memory exception" is received. The query is rewritten so that only log data in the "error" partition is searched/scanned, rather than all of the log data. For example, the "error" portion of the query is identified as corresponding to the "error" partition, and extracted and used to access the index for that partition. This reduces the amount of data that is scanned when determining a query result. In some embodiments, the query is rewritten such that a search of the appropriate partition(s) will return the same result that would have been returned if the query had been run against all log data (e.g., the query rewriting is only done when the results with and without rewriting can be guaranteed to be exactly the same). By rewriting the query to only scan log data in a matching partition, the relevant results can be accessed and returned much faster than the original query. This reduces the overhead in having to search through all of the other data, only to establish that there is no matching data in those indices. This provides benefits in the speed and efficiency of running queries. Further details regarding query rewriting will be described in more detail below.

Search head 120 is configured to perform the search of the partitioned and indexed data using the rewritten query. In some embodiments, the rewritten query is used to search indices 110 and return results relevant to the query.

The performance of querying can depend on how the log data has been partitioned/indexed, as well as what it is that users are querying for. For example, suppose that the platform observes that for the customer, 30% of the interactive queries contained either the word "error" or "exception," and that 80% of the interactive queries included a condition/metadata field/label on "source category" or "source host." An example of a source category is a category of a source of log data, such as "Apache." An example of a source host is a hostname for a source (e.g., "xyz.prod.sumo.com") or an Internet Protocol (IP) address of the host. Given a user's query patterns, it would be beneficial if log data were already pre-indexed/partitioned in a manner congruent to what was being queried, as this would increase query performance speed.

Partition generator 122 is configured to automatically determine a partitioning scheme. In some embodiments, a history of queries (e.g., query history 124) that have been run is evaluated/analyzed to predictively build partitions/define a partition scheme.

In some embodiments, the query history 124 is recorded using a query history recorder. The query history recorder (e.g., implemented as a script) is configured to record the queries that are run (e.g., the queries that users run interactively). For each query that is run, the following example information is recorded by the query history recorder:

What the query is (query)
What was the time range for the query (rangeDt)
How long did the query take to finish (executionDt)
How many messages were scanned (inputMessageCt)
How many messages were matched to the search expression (messageCt)

In some embodiments, the names in brackets are the corresponding key names for fields in explain plans that are recorded. In some embodiments, at the end of the execution of query, an explain plan is produced, which includes telemetry information associated with the query. As will be described in further detail below, explain plans can be used to estimate the cost of performing queries against data indexed according to a particular partition scheme. An example of an explain plan is as follows:

```
{
    "version": 2.0,
    "customerId": "00000000001591A7",
    "sessionId": "B845B9AA78C00DF5",
    "buildEngineDt": 8430104200687291662,
    "executionDt": 16,
    "ett": 5147,
    "slowdownReason": "UnKnown",
    "isInteractiveQuery": false,
    "exitCode": 0,
    "statusMessage": "Finished successfully",
    "isAggregateQuery": true,
    "isStreamScaledAggregate": true,
    "callerModule": "autoview",
    "callerSessionId": "0000000000000000",
    "savedSearchIdOpt": "None",
    "autoviewId": "1413543-_sumologic_report_0000000000001910_1446477738660",
    "numViews": 1,
    "rangeDt": 59999,
    "processDt": 59999,
    "kattaDt": 0,
    "mixDt": 1,
    "kattaCountDt": 0,
    "kattaSearchDt": 0,
    "kattaDetailsDt": 0,
    "streamSortDt": 0,
    "kattaNonAggregateQueryDt": 0,
    "kattaNonAggregateSortDt": 0,
    "kattaQueryDt": 0,
```

```
"kattaTimingInfo": {
  "totalTime": 0,
  "fetchTime": 0,
  "countComputationTime": 0,
  "hitsComputationTime": 0,
  "docsRetrievalTime": 0,
  "fieldExtractionTime": 0,
  "planGenerationTime": 0,
  "tupleProcessingTime": 0,
  "searcherCreationTime": 0,
  "prepQueueTime": 0,
  "ioQueueTime": 0,
  "cpuQueueTime": 0,
  "throttledSleepTime": 0
},
"kattaCriticalPathTiming": {
  "totalTime": 0,
  "timeSpentOnFailedRequest": 0,
  "streamTupleConversionTime": 0,
  "workQueueTotalTime": 0,
  "serverRoundTripTime": 0,
  "kattaTimingInfo": {
    "totalTime": 0,
    "fetchTime": 0,
    "countComputationTime": 0,
    "hitsComputationTime": 0,
    "docsRetrievalTime": 0,
    "fieldExtractionTime": 0,
    "planGenerationTime": 0,
    "tupleProcessingTime": 0,
    "searcherCreationTime": 0,
    "prepQueueTime": 0,
    "ioQueueTime": 0,
    "cpuQueueTime": 0,
    "throttledSleepTime": 0
  }
},
"kattaPerMethodCriticalPath": {},
"inputMessageCt": 0,
"messageCt": 0,
"rawCt": 0,
"queryCt": 0,
"hitCt": 0,
"cacheCt": -1,
"throttledSleepTime": 0,
"activeSignatureCt": -1,
"totalSignaturesCt": -1,
"initializationDt": 0,
"lookUpInitializationDt": 0,
"saveViewType": "Index",
"saveViewRowCt": 0,
"saveViewTimeTaken": 4,
"sortTimeTaken": 0,
"summarizeTimeTaken": 0,
"summarizeRowCt": 0,
"matchSignatureInitTime": 0,
"inferSignatureDoneTime": 0,
"parseRegexTime": 0,
"indexCt": 0,
"uniqueIndexCt": 0,
"indexHitCt": 0,
"uniqueIndexHitCt": 0,
"indexCtAfterBloomfilter": 0,
"uniqueIndexCtAfterBloomfilter": 0,
"parallelism": [],
"indexBatchCt": 1,
"kattaClientException": [],
"streamProcessingDt": 0,
"operatorTime": 0,
"operatorRowCount": [
  {
    "name": "expression",
    "rowCount": 6,
    "time": 0
  },
```

```
    {
        "name": "saveView",
        "rowCount": 2,
        "time": 3
    }
],
"pauseDt": 0,
"gcTime": 0,
"kattaStragglers": [],
"tiers": [],
"numberRegexTimeout": 0,
"bloomfilterTimeTaken": 1,
"viewExtractionTimeTaken": 0,
"kattaSearcherTranslateDt": 0,
"executionStartTime": 1475691157904,
"executionEndTime": 1475691157920,
"queryStartTime": 1475691067899,
"queryEndTime": 1475691127898,
"kattaStartTime": 1475691157911,
"kattaEndTime": 1475691157914,
"sessionQueryUpdateTimes": {
    "first": 9,
    "count": 1,
    "avg": 9,
    "stddev": 0.0,
    "max": 9
},
"nrtUsed": false,
"nrtErrorCt": 0,
"nrtCt": 0,
"nrtDt": 0,
"bloomFilterResult": {
    "OutOfTimerange": 0,
    "Maybe": 0,
    "DontKnow": 0,
    "No": 0,
    "NotReturned": 0
},
"query": "_sourceCategory=cloudtrail_aws_logs AND
\"workdocs.amazonaws.com\" | parse \",\\\"userName\\\":\\\"*\\\",\"as username |
parse \",\\\"DocumentSizeInBytes\\\":*,\"as docsizebytes | parse
\",\\\"DocumentName\\\":\\\"*\\\",\"as documentName | parse
\",\\\"eventName\\\":\\\"*\\\",\"as eventname\n| count as accessed by
documentName \n | save view _sumologic_report_0000000000001910_
1446477738660",
"reportedSlow": false,
"reportedSlowTime": -1,
"reportedSlowSearchedToTime": -1,
"finalQuery": "((*)) and (_sourceCategory=cloudtrail_aws_logs
and \"workdocs.amazonaws.com\") and \"eventname\"and \"documentname\"
and \"documentsizeinbytes\" and \"username\" | parse anchor
\",\"userName\":\"*\",\"as (username) | parse anchor
\",\"DocumentSizeInBytes\":*,\"as (docsizebytes) | parse anchor
\",\"DocumentName\":\"*\",\"as (documentName) | parse anchor
\",\"eventName\":\"*\",\"as (eventname) | count as accessed group by
documentName | save view _sumologic_report_0000000000001910_
1446477738660",
"rbacFilter": "(*)"
}
```

In some embodiments, the contents/characteristics/components of the queries that have been run over time (e.g., a three-month period or any other appropriate time window) can be evaluated to determine an optimal manner in which log data should be partitioned to increase the speed of queries to be run (e.g., the query history is used to predict a partition scheme that will improve performance of future queries).

As will be described in further detail below, in some embodiments, fragments of queries (also referred to herein as "query fragments") that are found to be common across the queries in the query history are identified. The common query fragments are evaluated to determine their potential in defining corresponding candidate partitions, where, for example, the query fragment is used as a condition on which to index/partition data into a corresponding bucket.

In some embodiments, the query fragments include prefixes of queries that correspond to characteristics of the queries (e.g., metadata field values) and can be extracted and/or derived from the queries in the query history.

Query fragments can include various portions or subportions of a query. For example, suppose that a user specifies a query for "error out of memory exception." "Error out of memory exception" is an example of a query fragment. Sub-portions of fragments are also examples of fragments, such as "error" and "out of memory exception."

Query fragments can also be derived by manipulating portions of queries. For example, suppose that the query fragment "xyz.prod.sumo.com" is identified, but is not common in many queries because the "xyz" portion changes frequently. Because the "xyz.prod.sumo.com" is uncommon in queries, it may not be an ideal candidate for defining partitions, as it would result in the creation of too many partitions. The query fragment can be manipulated to generate a new query fragment, where, in this example, the "xyz" portion of the fragment is replaced with a wildcard, "*", resulting in the generated query fragment "*.prod.sumo.com." It can then be determined that this query fragment appears much more frequently in queries. Additional examples of query fragments are described in conjunction with FIG. 7.

In some embodiments, a random sample of queries is evaluated to determine common query fragments. The frequency of query fragments can be determined, and those query fragments that exceed a threshold are determined to be common. In other embodiments, the query fragments are sorted by frequency, and the most common query fragments (e.g., top ten, or any other appropriate number) are selected. The identification of common query fragments is used to predict what future queries will include (i.e., the common query fragments are those that future queries are predicted to also include).

In order to determine the viability of the query fragments to be used in building partitions, in some embodiments, the selectivity of the query fragments is determined. The selectivity of the query fragment refers to the uniqueness/variation of the value associated with the query fragment in the stored log data. For example, the selectivity indicates the likelihood that a query fragment is repeated in logs. Typically, a high selectivity is indicative of a high variation in the values of the corresponding field in the data (i.e., a large number of different values for the field), while a low selectivity is indicative of a low variation. If log data is indexed/partitioned according to a highly selective query fragment, then queries that include the query fragment and use/access the index would be more selective/discerning in returning a relevant set of results, which can be more efficient than simply scanning all of the log data.

For example, suppose that the term "info" is a query fragment that is determined to exist in 85% of log data (i.e., there is not much variation in the field associated with the "info" value, and the value "info" repeats with a high likelihood). Such a query fragment would not make for a good partition candidate, as the partition would include a large amount of data that would have to be searched through in response to a query, and any performance gains would be negligible.

In some embodiments, different combinations of query fragments can be used to define candidate partition schemes/sets. Example partition sets include partitions automatically built from (combinations of) query fragments, such as "error," "error" OR "exception," and "exception," as described in the examples above. For example, "error" OR "exception" can be used to define one partition, or two partitions can be built, one for "error" and one for "exception." Thus, a variety of different candidate partition sets can be generated.

The viability of the candidate partition schemes is then evaluated to determine a partition scheme to implement. In some embodiments, the viability of a partition scheme is determined based on the selectivity of the candidate partition scheme, which can include a query fragment or combinations of query fragments, as described above. The selectivity of the candidate partition scheme can be estimated by evaluating the candidate partition scheme against a sample of log data. In some embodiments, the automatic partition generator is configured to explore a variety of candidate partitions built from (combinations of) query fragments, identifying candidate partitions that correspond to a (combination of) query fragment(s) that are commonly found in queries and that are highly selective with respect to collected logs.

For example, using the query condition "error out of memory exception," suppose that it is determined that the selectivity of the query fragment "error" is 1.5% and that the selectivity of the query fragment "exception" is 0.6%. The selectivity of the (logical) combination of query fragments can also be determined. For example, the selectivity of "error" OR "selectivity" is determined to be 2%. The combination can be specified using a Boolean operator or through any other appropriate combination function.

The viability of the candidate partition schemes can also be determined by estimating the benefits that would be gained if the partition scheme were built and implemented (including (re)indexing log data using the partition scheme, rewriting queries, etc.). In some embodiments, the candidate partition schemes are tested against a portion of log data and query history to determine what benefits, if any, would result from implementing the candidate scheme. The testing can include indexing a portion of the log data using the candidate partition scheme, and rewriting some queries in the query history according to the partition scheme. In some embodiments, the cost of defining the candidate partition scheme, indexing log data according to the candidate partition scheme, and rewriting queries is determined. The cost estimate can also be compared against the performance of the original set of queries (determined, for example, from the recorded information for previously run queries (e.g., query history 124, as described above)) to determine/estimate any potential savings (e.g., in cost/resources spent).

Based on the evaluation of the candidate partition schemes, an optimal partition scheme is selected, and partitions are built according to the partition scheme. Incoming log data is partitioned according to the partition definitions. Future queries are also rewritten based on knowledge of the partition scheme.

By building partitions that reflect the queries that are running (i.e., having the partitions more congruent to the queries), increases in query performance (e.g., speed) can be realized. Further details regarding automatic partitioning are described below.

In this example, platform 100 is illustrated as a single logical device. In some embodiments, platform 100 is a scalable, elastic architecture and may comprise several distributed components, including components provided by one or more third parties. Further, when platform 100 is referred to as performing a task, such as storing data or processing data, it is to be understood that sub-component or multiple sub-components of platform 100 (whether individually or in cooperation with third party components) may cooperate to perform that task.

Automatic Partition Building

Figure 2:
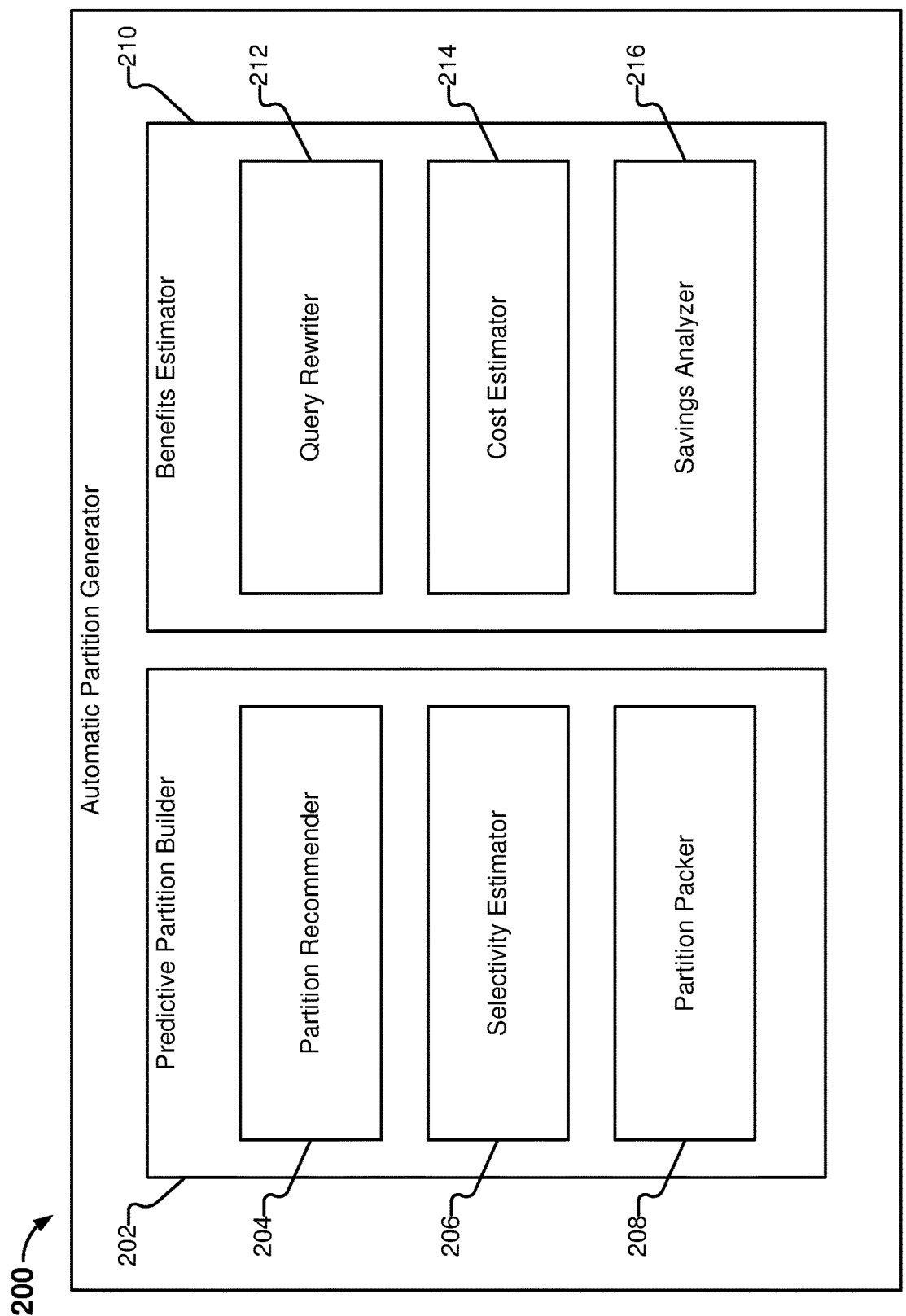
FIG. 2 is a block diagram illustrating an example embodiment of a partition generator.

FIG. 2 is a block diagram illustrating an example embodiment of a partition generator. In some embodiments, partition generator 200 is an example of partition generator 122. In the example shown in FIG. 2, partition generator 200 includes predictive partition builder 202 and benefits estimator 210. Predictive partition builder 202 further includes partition recommender 204, selectivity estimator 206, and partition packer 208. Benefits estimator 210 further includes query rewriter 212, cost estimator 214, and savings analyzer 216.

In some embodiments, by automatically generating partitions using the techniques described herein, numerous partition schemes can be explored and evaluated to determine an optimal partitioning scheme that will improve search performance.

Predictive partition builder 202 is configured to build partitions predictively. In some embodiments, the partitions are built based on an evaluation of query history.

Partition recommender 204 is configured to generate candidate partitions. The candidate partitions are generated based on an evaluation of the history of queries run (e.g., query history 124 of FIG. 1). The time window/period of queries that are evaluated can be adjustable (e.g., last 7 days, last 14 days, last 30 days, last 90 days, last 6 months, etc.).

Different sets of partitions are then generated/defined. These can include partitions already defined in the platform (e.g., used in production). The defined partitions can also include candidate partitions that have not yet been implemented at runtime (e.g., potential partition sets). In some embodiments, a candidate partition is defined based on a combination of query fragments that are used to determine the condition on which logs are placed in the candidate partition.

In some embodiments, recommending a partition includes obtaining the history of queries ran and using the history of queries ran to determine a mapping of a single term (e.g., source host, source name) to a sparse partition name/definition.

Selectivity estimator 206 is configured to obtain a sparse partition definition (e.g., from partition recommender 204) and use a sparse partition definition to determine an estimated density of the sparse partition. For example, given the definition for a candidate partition, a density of the partition is estimated.

In some embodiments, the density of a candidate partition is determined by obtaining a (random) sample of logs. Each log is evaluated to determine whether it meets the conditions (e.g., a function based on the combination of query fragments corresponding to the candidate partition) to be included in the partition. The number logs included in the candidate partition are determined and used to estimate the density of the partition.

In some embodiments, the resulting determined selectivities of the analyzed/evaluated query fragments/candidate partition sets can be provided as output, for example, in a comma separated values (CSV) file that includes candidate query fragment/partitions and resulting selectivities.

Partition packer 208 is configured to obtain a sparse partition density (e.g., determined using selectivity estimator 206) and use the sparse partition density to determine a mapping of sparse partitions to partitions. In some embodiments, the partition packer is configured to evaluate sparse partitions (e.g., which may include highly selective partitions that have been suggested as candidate partitions), and determine whether some of the sparse partitions may be, or should be, combined together. This may be performed, for example, to reduce the number of partitions (e.g., prevent the number of partitions from growing too large). In some embodiments, the determination of whether partitions may be combined is performed by using selectivity estimation. The selectivity estimation is used to determine whether the selectivity (and therefore gain) can be kept high by, for example, OR-ing the conditions on partitions together. An iterative hierarchical process may be used to arrive at the candidate partitions, where, for example, the partition packer iteratively runs over its own output until a target optimization is reached.

Benefits estimator 210 is configured to estimate the benefits of a partitioning scheme, such as a candidate partition scheme generated by predictive partition builder 202. In some embodiments, the benefits estimator is implemented as a search performance model (a model used to determine performance of queries and obtain query results). The search performance model can be used to calculate/determine the impact on runtime query performance if a given partition scheme were implemented (along with indexing and query rewriting).

In some embodiments, the evaluation of the benefits is determined based on the recorded history of queries run (e.g., query history 124 of FIG. 1).

Query rewriter 212 is configured to obtain one or more queries and a partitioning scheme, and rewrite old queries into rewritten queries according to the partition scheme.

In some embodiments, the query rewriting logic is configured to determine what kinds of queries will/should be rewritten and how they are to be rewritten in order to access the index into which data (partitioned according to the partition scheme) is stored. The following is an example of a query that will be rewritten given a new generated partition. Consider a query "error 404". Suppose that there is a partition that has all of the messages that contain the term "error". Suppose that the partition is called "error_322". The query will then be rewritten, for example, to "partition=error_322 AND 404". As will be described in further detail below, in some embodiments, the evaluation of the estimated improvement in performance for candidate partitions generated from query fragments takes into account the rewritten queries.

Cost estimator 214 is configured to determine the cost of pre-calculating results associated with a (combination of) query fragment(s). In some embodiment, pre-calculating results includes indexing log data into a partition corresponding to the query fragment(s).

In some embodiments, estimating costs includes obtaining a query, explain plans, partitions, and their densities (e.g., determined using selectivity estimator 206 of FIG. 2), and using the information to estimate a new cost of the query. As described above, an explain plan, in some embodiments, is a record of the telemetry and execution statistics, timings, etc. associated with queries. Explain plans may be used to evaluate the historical performance of queries. For example, the explain plan provides a historical record of the execution particulars of queries. Evaluation of the historical queries can then be performed without having to observe query execution in real-time and waiting for queries to be executed in order to obtain an estimated cost (i.e., the querying is already instrumented, where the output of the instrumentation includes explain plans).

In some embodiments, the cost estimator is configured to determine/estimate the cost (e.g., computing resource cost) of building new partitions with particular densities (e.g., determined using selectivity estimator 206), indexing log data according to the new partitions, and rewriting queries. As one example, the cost is estimated by recording information associated with the tested (rewritten) queries used to access the indices/partition, where the recorded information includes, in various embodiments, what the query is, what was the time range for the query, the amount of time taken to finish the query, the number/amount of logs/messages/data that was scanned/searched through in order to determine a result, and the number of messages that matched to the tested (rewritten) queries.

Savings analyzer 216 is configured to determine an expected cost/resource savings if data were to be partitioned using the query fragment. In some embodiments, the cost savings is based on a likelihood of a query using/hitting this fragment in the future and how much work would be avoided because results have been pre-calculated (i.e., indexed by adding to a generated partition).

In some embodiments, the savings analyzer is configured to determine an expected time savings. In various embodiments, the expected time savings can be estimated based on the likelihood of a query using this (combination of) query fragment(s) in the future and how much time would be saved because results have been pre-calculated (e.g., log data has been partitioned/indexed to the partition corresponding to the (combination of) query fragment).

In some embodiments, analyzing savings includes obtaining a new set of queries and estimating savings. In some embodiments, the new set of queries comprises a test set of queries (where, for example, a training set of queries was used to perform partition recommendation).

In some embodiments, the savings analysis is performed by recording performance information associated with the new rewritten queries that are run based on the partitioning scheme, and comparing that information to the performance information recorded for the original query. One example of determining savings is to compare the number of messages scanned using the rewritten query against the number of messages scanned using the original query. Other performance information, such as the time taken to finish the query and the number of matching messages, can also be compared. In some embodiments, a comparison of a combination of such factors/performance information is used to determine savings.

In some embodiments, using the benefits estimator, the impact of partition rebuilding and corresponding indexing and query rewriting on query speed/performance can be assessed/modeled.

For example, given a set of defined partitions, it can be modeled that, given the selectivity of query fragments used to define the partitions, one set of queries (that includes the query fragments) will run five times faster, while another query would run two times slower. In some embodiments, the proportion (e.g., represented using a percentage or fraction) of queries that would be run faster given the candidate partition is also determined.

In some embodiments, for each candidate partition set, a search performance metric is generated, where the search performance metric is a metric that indicates the query performance for searches given a particular candidate partition set. As one example, the search performance metric is generated based on the results of the cost estimator and/or savings analysis, using the candidate partition set definitions, corresponding selectivities, query rewriting, and log data. In some embodiments, each partition set is evaluated against the same query history (where the query history is constant for a particular customer). In some embodiments, the search performance model (benefits estimator) is also constant for the customer or a type of customer.

Continuing with the above example three candidate partition sets "error"; "error" OR "exception"; and "exception." Suppose that the first candidate partition, corresponding to "error," receives a corresponding calculated search performance metric value of 620.

The second candidate partition, corresponding to "error" OR "exception," receives a search performance metric value of 720.

The third candidate partition, corresponding to "exception," receives a search performance metric value of 900.

In this example, the third candidate partition, based on having the highest search performance metric value, is determined to result in the largest expected performance impact (improvement) if implemented.

The exploration of various automatically generated candidate partition sets allows the determination of an optimal tradeoff between the number of partitions defined and the impact on query speed, where some queries may become slower with an increased number of partitions. In some embodiments, the goal of the search performance model/benefits estimator is to determine an optimal solution that maximizes query performance. This is done, as described above, by exploring/evaluating the various partition candidates and determining the candidate partition set that yields, for example, the largest increase/improvement in query performance.

In some embodiments, the partition generator, based on the analysis of the partition candidate sets performed using the benefits estimator, provides as output (e.g., to a user) a report that indicates the improvement in performance that would be yielded if a candidate partition set were generated (and put into, for example, production use). For example, the report can indicate that 30% of queries would run fifteen times faster if the recommended partitions were generated and used to divide data. In some embodiments, the analysis is performed on a per-customer basis. In some embodiments, a user is provided the partition recommendation (e.g., in a report) so that they can review the partition recommendation. The user may then indicate whether they approve of the recommendation and would like to proceed with partitioning according to the recommendation. If the user indicates their approval or confirmation of the recommendation, then partitions are built according to the recommendation. In other embodiments, partition recommendations are not provided to users, and partitions are built automatically based on the evaluation of partition candidates described above, without requiring user approval.

When a new partition scheme is implemented, various steps are taken, which can include building the new partitions of the partition scheme, (re)indexing incoming log data into the newly built partitions, and configuring query rewriting logic to rewrite future queries according to the partition scheme. In some embodiments, indexing includes running batch queries in the background, and storing returned results to the query in an appropriate index. In some embodiments, rewriting queries includes determining/deriving query fragments from received queries that will match to the new indexes (where, for example, the query fragments include those determined to be common in previous queries).

Thus, assuming, for example, a cost (e.g., monetary/economic cost, computation processing/memory cost, or any other appropriate cost) per minute rate on interactive (query) time, an expected cost saving for every optimization (e.g., each candidate partition scheme defined using some combination of query fragments) can be assigned. In some embodiments, when there is a large expected savings, optimization of that query is recommended, and automatic optimization of queries (automatic partitioning) is performed.

Thus, using the auto-partitioning techniques described herein, future queries can be rewritten to use pre-calculated results (e.g., logs that have been indexed into built partitions) that are stored in the index—and because time has been saved in not having to do part of the work on-demand (e.g., scanning only relevant partitions rather than through all data), the on-demand run time querying performance is improved. In some embodiments, if on-demand time is much more valuable than what it takes to pre-calculate results and store them (e.g., pre-partition/index collected log data), it can be determined that it would be beneficial to perform partition optimization by rebuilding the partitions.

As described above, using the techniques described herein, past history of what was actually queried by users is evaluated to determine a recommended partition scheme. In some embodiments, the query history is divided into test and training data sets, where recommendations are made on training data, which are then verified with the test data, for example, using a goodness function such as the search performance model/benefits estimator described above.

In some embodiments, the partition rebuilding is performed at various points in time, for example, periodically or on a time—driven basis. For example, query history can be evaluated periodically to account for potential changes/movements in query patterns (i.e., what users query for may change over time), or for example, as old data ages out. For example, as old data ages out, it can be determined whether the size of a partition falls below a threshold (e.g., as old data ages out, new data is no longer being added to a particular partition), and if so, partition rebuilding can be performed. Candidate partition schemes can then be generated and analyzed as described above to determine if it would be beneficial to perform partition rebuilding. Thus, as data and query behavior change over time, partitioning decisions can be re-evaluated over time as part of an iterative process.

As another example, as query patterns change (e.g., determined based on an analysis of query history), new candidate partitions can be automatically tested, and any that would yield a significant improvement/benefits in query performance (e.g., as determined using the benefits estimator/search performance model described above) can be recommended. In some embodiments, partitions are automatically generated and implemented in the background, and can be done without requiring review by users. In other embodiments, the auto-partitioning is reviewed by human users, and after a certain confidence has been reached in the results of the partitioning, the auto-partitioning can be performed automatically in the background, without requiring review.
Reworking In some embodiments, the partitions that are predictively built based on query history using the techniques described herein are implemented and used to index/partition future data going forward. Thus, new data will be partitioned and indexed based on the automatically generated partitions. In some embodiments, existing data can also be retroactively repartitioned using the newly recommended/automatically generated partitions, a process referred to herein as "reworking."

In some embodiments, reworking includes re-indexing data so that it is aligned partition-wise with other data going forward. In one example of reworking, a copy of the existing data (referred to herein as a "scheduled view") is repartitioned. This allows the amount of system downtime required to perform reworking to be reduced. In some embodiments, the reworking and repartitioning is performed when the size of partitions falls below a threshold. In some embodiments, the decision of whether to repartition copies of existing data or the existing data itself is determined dynamically. Various tradeoffs may exist, where, for example, one partitioning scheme could lead to huge benefits for some queries, but impact other queries negatively. Non-uniformity due to a large number of queries being issued may make determining what tradeoff to make challenging. In some cases, it may be beneficial to not partition data (e.g., taking ABC and turning it into A, B, C), but instead, for example have ABC and also C, because having C on its own benefits enough queries to justify the cost of copying a part of the data (C, to be precise in this example). In this case, C is not a partition of ABC, but a partial copy. A cost function may be used to determine whether to generate such copies. The cost function may be used to determine whether it may be beneficial, for example, to not split data into partitions, but also have portions of data copied.

As described above, re-evaluation and rebuilding of partitions can be performed periodically. In some embodiments, a versioned history of the state of the partitions at various points in time is maintained. For example, each time that a partition scheme is defined/generated/implemented, it is associated with a timestamp.

Partitions can be changed as often as desired (or automatically as described above), with corresponding query rewriting taking into account the partition scheme change, such that queries are rewritten to the correct indexes (corresponding to the new partitions) to ensure that there are no duplicates and no data left. For example, regarding duplicates, when partitioning a dataset, no data is duplicated (i.e., in some embodiments, every message is in one and only one partition). When a query is made across partitions, then no message will be returned more than once. In some embodiments, an additional deduplication step is performed. For example, data may be copied in some cases, and when a query stitches results together, some messages may appear more than once. Deduplication may then be performed, for example by message ID, before results are returned to a user. Regarding ensuring that no data is left, in some embodiments, every message that is received is placed in at least one partition such that no message is not partitioned. If a message were not included in a partition, then it would not be returnable during query time, leading to incorrect results.

In some embodiments, the techniques for partition rewriting include maintaining an entire history of the changes that are made on the partitions. The query rewriting piece can take the version history into account when performing rewriting, accordingly. For example, if an "error" partition did not exist on a certain data, or the "error" partition was changed to "error OR exception" on a particular date, this information can be factored into the running of queries against data divided into the partitions at that particular time, such that queries are rewritten in a manner that is congruent with the state of the partitions as of the date of interest. Thus, based on a different history of partition changes, the query rewriting will occur differently (the query rewriting is congruent with/aligned to the partition scheme).

Figure 3A:
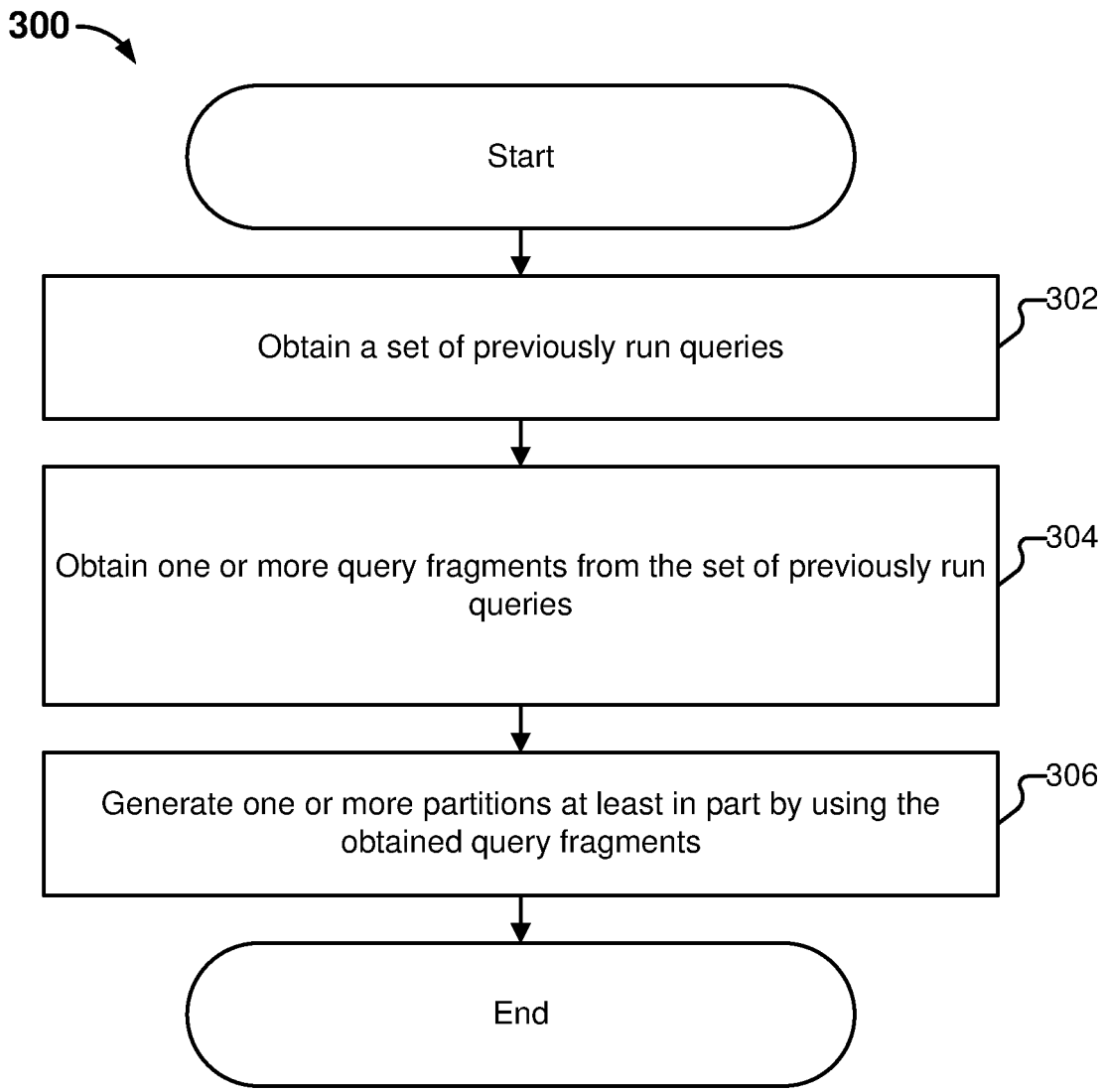
FIG. 3A is a flow diagram illustrating an embodiment of a process for automatic partitioning.

FIG. 3A is a flow diagram illustrating an embodiment of a process for automatic partitioning. In some embodiments, process 300 is executed by data collection and analysis platform 100 of FIG. 1. The process begins at 302, when a set of previously run queries are obtained. At 304, one or more query fragments are obtained from the set of previously run queries. In some embodiments, the query fragments include fragments of queries that are determined to be common among the set of previously run queries. The determination of whether a query fragment is common may be performed based on an analysis of a frequency of occurrence of the query fragment in the set of previously run queries. In some embodiments, selectivity of the query fragments is determined based on an amount of log data that include the query fragments.

At 306, one or more partitions are generated at least in part by using the obtained query fragments. In some embodiments, a partition corresponds to a combination of one or more query fragments. A partition may be generated based on the selectivities of the query fragments. For example, as described above, different partition candidate sets/schemes may be generated and evaluated. The candidate partition sets may be evaluated based on a search performance model, an estimation of benefits and/or savings, etc. to determine an optimal candidate partition set. Partitions may then be generated according to the candidate partition set determined to be optimal. In some embodiments, the candidate partition set determined to be optimal is provided as output to a user for review. If the user approves the recommended or suggested candidate partition set, then partitions may be generated according to the candidate partition set (e.g., the recommended candidate partition set/scheme is applied). In some embodiments, the partition generation is performed without requiring review.

Log data may then be indexed by adding log data to the generated partitions. In some embodiments, indexing a piece of log data includes determining that the piece of log data includes one or more query fragments corresponding to a particular partition. The piece of log data is then added to the particular partition. Further details regarding indexing are described below. The partitioned data may be queried. For example, a query for log data is received. In some embodiments, the query is rewritten, as described above, according to the generated partitions. A search of the partitions may then be performed using the rewritten query. Re-evaluation and rebuilding of partitions may be performed (e.g., on a recurring basis), for example, to account for changes in data and query behavior over time.

Figure 3B:
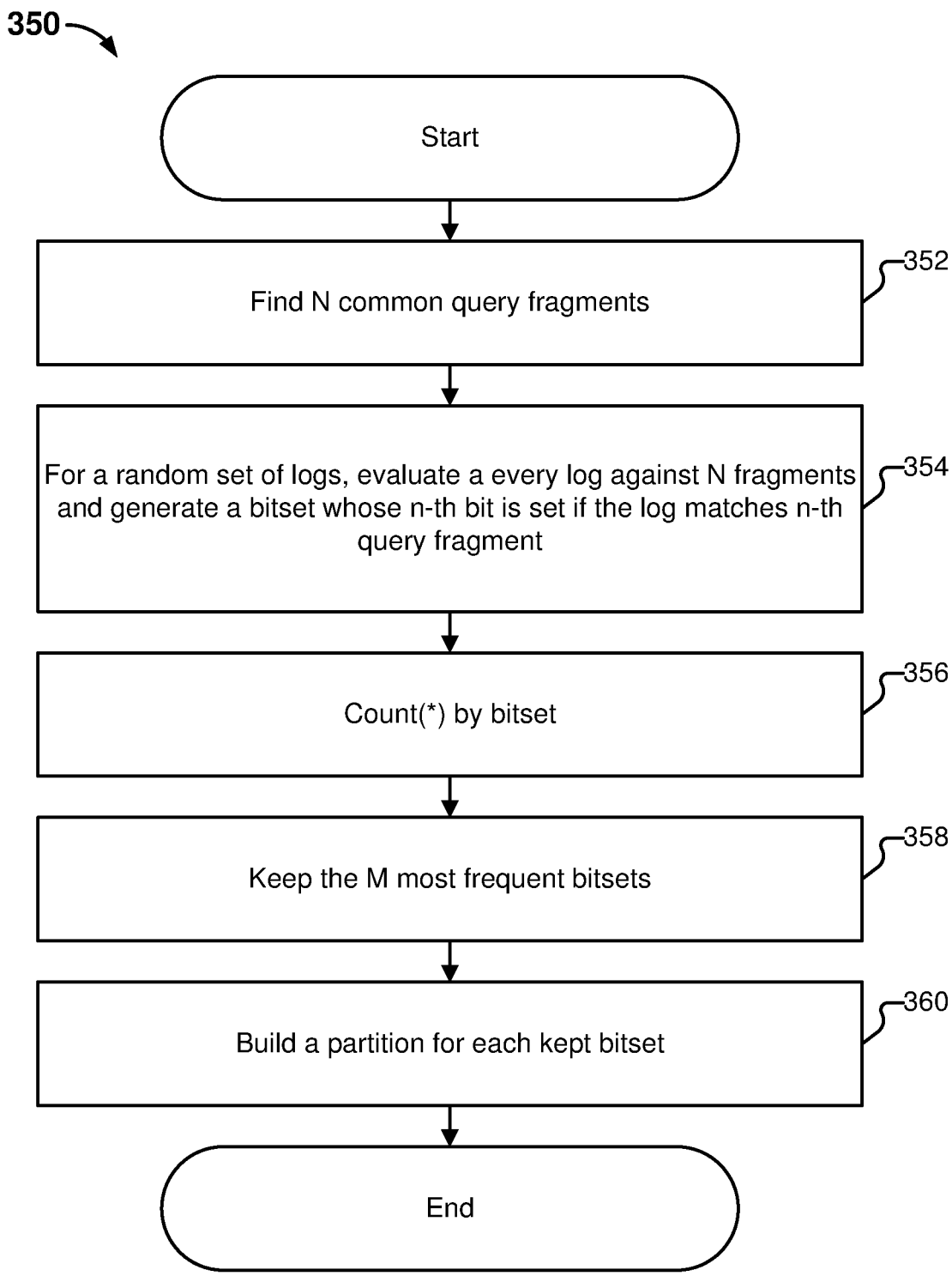
FIG. 3B is a flow diagram illustrating an embodiment of a process for automatic partitioning.

FIG. 3B is a flow diagram illustrating an embodiment of a process for automatic partitioning. In some embodiments, process 350 is executed by data collection and analysis platform 100 of FIG. 1. In some embodiments, process 350 is an example of process 300 of FIG. 3A. The process begins at 352, when N common query fragments are found. At 354, for a random set of logs, every log is evaluated against the N fragments, and a bitset whose n-th bit is set is generated if the log matches the n-th query fragment. At 356, a count(*) by bitset is performed. At 358, the M most frequent bitsets are kept. At 360, a partition is built for each kept bitset.

In some embodiments, a bitset represents a partition definition, where the partition definition is built using combinations of common query fragments. By using process 350, different bitsets that correspond to different combinations of query fragments can be generated. For example, the most common query fragments can be derived/extracted from a history of queries run, as described above. A set of logs is obtained. For example, a random set of logs is obtained. Each log is evaluated to determine which of the common query fragments it contains. This can include generating a bitset, where each bit in the bitset corresponds to one of the common query fragments. If the log contains a query fragment, then its corresponding bit is set (e.g., to 1), while if a query fragment is not in the log, then it is not set (e.g., left at 0). For example, suppose that four common query fragments have been identified: "error"; "exception"; "source_category=Apache"; and "source_host=*.prod.sumo.com". Suppose now that a given log in a random sample of logs is to be evaluated. A bitset with four bits, each corresponding to one of the identified common query fragments, is initialized to 0000. The log is then evaluated to determine whether it contains each of the four query fragments. If so, then the bits corresponding to matching query fragments in the log are set to 1.

Thus, a corresponding bitset is generated for each log. For example, if 1000 logs are evaluated, then 1000 corresponding bitsets are generated. Each bitset corresponds to/represents a particular candidate partition. The selectivity of each bitset (candidate partition) is determined in part by evaluating the number of logs that match to the different bitsets. The frequency of the occurrence of each unique bitset that was generated is then determined. This can be done by counting, for each unique bitset, the number of times that it was generated. The most frequently occurring bitsets are used to build corresponding partitions.

In some embodiments, the benefits of using the partition scheme are also determined, using the search performance model/benefits estimator described above. In some embodiments, a search performance metric is determined for each candidate partition (represented by the bitset/combination of query fragments). The cost estimate/savings analysis described above (which can be represented by the search performance metric) can also be used to determine whether a candidate partition should be built.

In some embodiments, the automatic partition generation of process 350 is performed on a time-driven basis, for example, periodically. This can be done to accommodate for changes in query patterns, or, for example, as log data ages. In some embodiments, the automatic partition generation is performed in response to an evaluation of query history. For example, a record/history of the N most common query fragments within a time period (e.g., last 90 days) can be obtained. The query history (e.g., samples of) can be re-evaluated at various times (e.g., weekly, monthly, etc.) to determine whether the top N most common query fragments have changed. In other embodiments, if partition sizes fall below a threshold (e.g., as old data ages out and new data does not fill existing partitions), partition rebuilding can also be performed. If it is determined that partitions should be rebuilt (or that whether partitions should be rebuilt should be evaluated), then process 350 may be repeated to determine whether implementing a new partitioning scheme that is aligned/more congruent with the user queries would improve search performance.

Indexing

Figure 4:
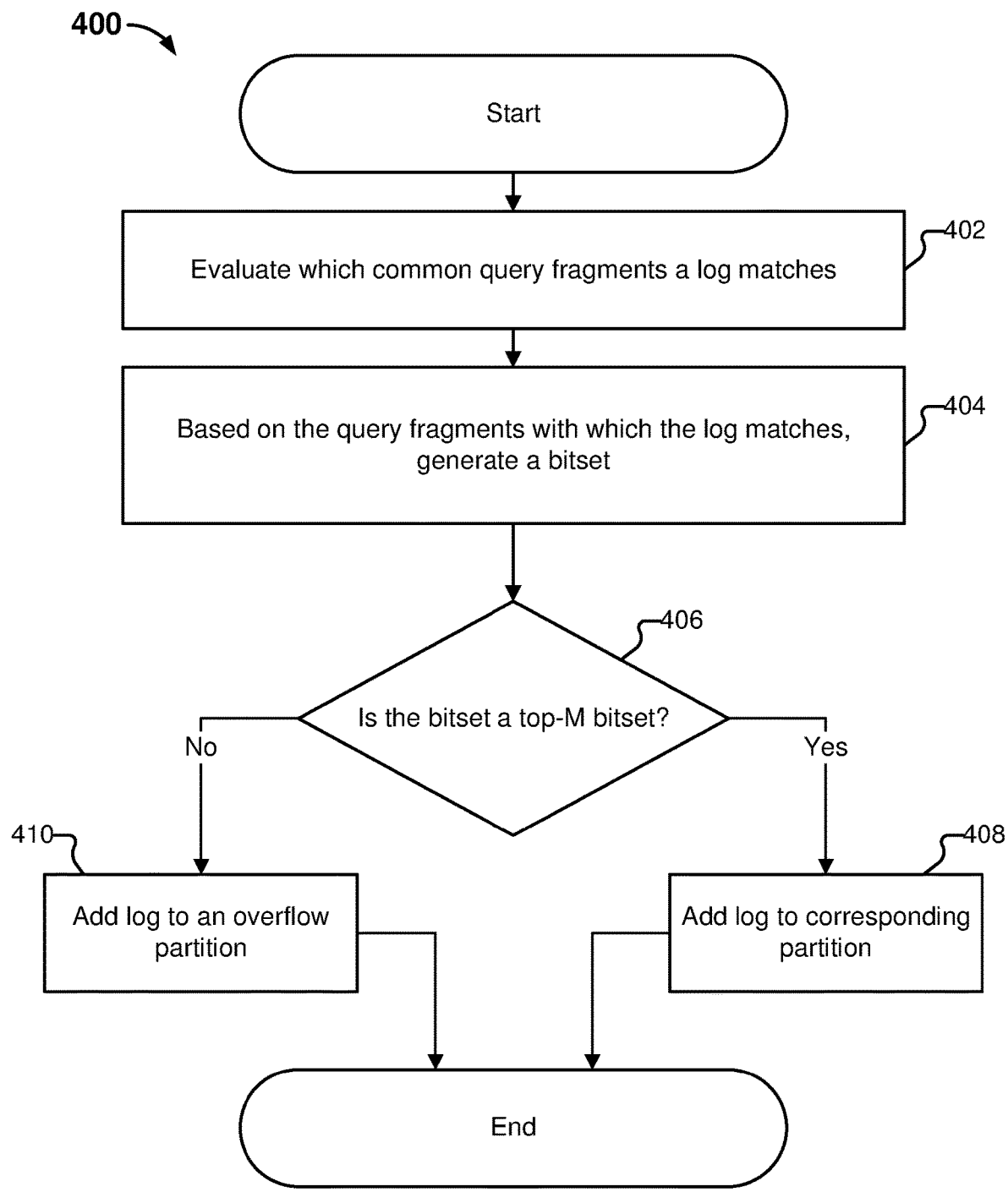
FIG. 4 is a flow diagram illustrating an embodiment of a process for indexing a log.

FIG. 4 is a flow diagram illustrating an embodiment of a process for indexing a log. In some embodiments, process 400 is executed by data collection and analysis platform 100 of FIG. 1. The process begins at 402, when which common query fragments a log matches are evaluated. The log can include newly collected log data, as well as existing log data (e.g., that was indexed according to a prior partition scheme). The common query fragments can be determined, as described above, by evaluating a history of queries and determining common prefixes in the queries, for example, based on the frequency of the prefixes in the queries. At 404, a bitset is generated based on which of the common query fragments the log matches. At 406, it is determined whether the generated bitset is a top-M bitset (e.g., the M most frequent bitsets as kept at 358 of FIG. 3B). If so, then the process continues to 408 where the log is added to a corresponding partition. If not, then the process continues to 410, where the log is added to an overflow partition. In some embodiments, the overflow partition is a bucket for logs which do not match the conditions of the other defined partitions.

In some embodiments, incoming log data is indexed using process 400. As described above, reworking, can be performed to align previously stored data (which may have been indexed according to a different partition scheme) with a new partition scheme.

Search Time

Figure 5:
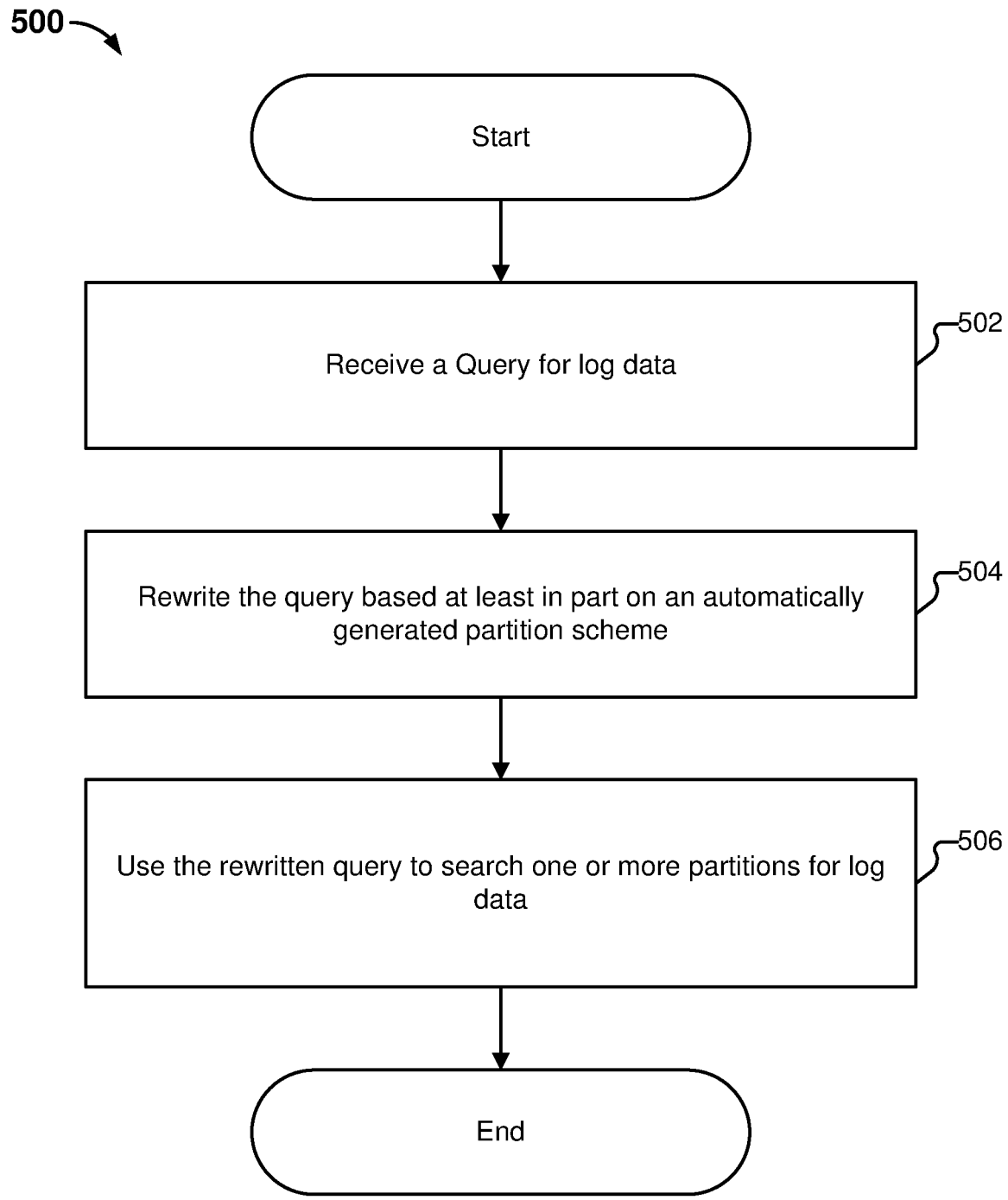
FIG. 5 is a flow diagram illustrating an embodiment of a process for performing a search.

FIG. 5 is a flow diagram illustrating an embodiment of a process for performing a search. In some embodiments, process 500 is executed by data collection and analysis platform 100 of FIG. 1. The process begins at 502 when a query for log data is received. At 504, the query is rewritten based on an automatically generated partition scheme. At 506, the rewritten query is used to search one or more partitions for log data.

Figure 6:
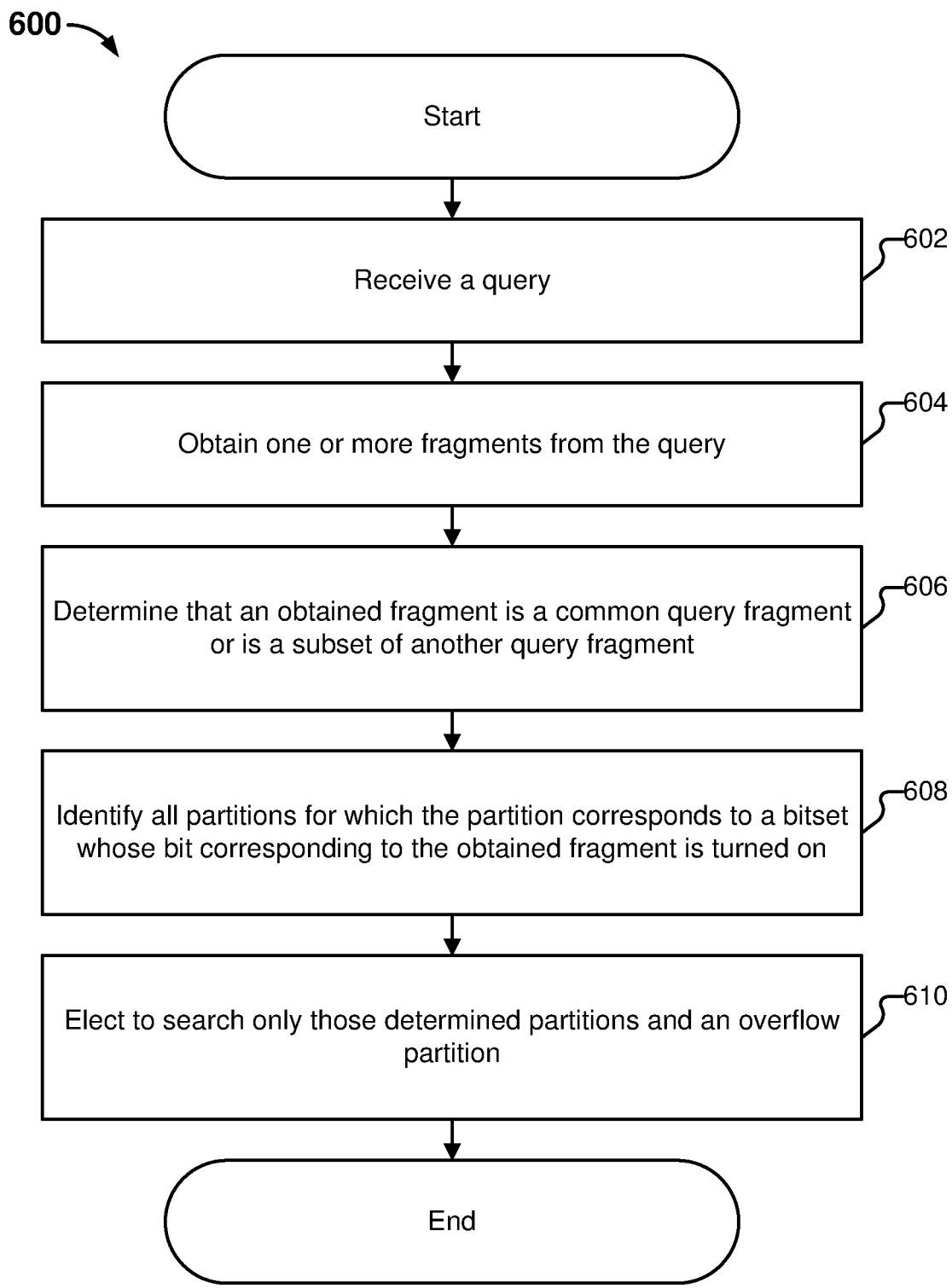
FIG. 6 is a flow diagram illustrating an embodiment of a process for performing a search.

FIG. 6 is a flow diagram illustrating an embodiment of a process for performing a search. In some embodiments, process 600 is executed by data collection and analysis platform 100 of FIG. 1. In some embodiments, process 600 is used to implement process 500 of FIG. 5. The process begins at 602 when a query is received. One example of a received query is an interactive query provided by a user. In some embodiments, process step 602 is used to implement process step 502 of FIG. 5. At 604, one or more fragments are obtained from the query. For example, components/prefixes/portions of the query are extracted/derived, as described above. At 606, it is determined that an obtained fragment is a common query fragment or is a subset of another query fragment. In some embodiments, process steps 604 and 606 are used to implement process step 504 of process 500 of FIG. 5. At 608, all partitions that correspond to a bitset whose bit corresponding to the obtained fragment is turned on are identified. At 610, only those partitions that are identified and an overflow partition are elected to be searched. In some embodiments, process steps 608 and 610 are used to implement process step 506 of process 500 of FIG. 5.

An example of the processing of FIG. 6 is as follows. Suppose, for example, that a user would like to search for "A and B| . . . ". "A" is a common query fragment or is a subset of another query fragment. All partitions for which the following is true are found: that this partition corresponds to a bitset whose bit corresponding to "A" is turned on. Only those partitions and the overflow partition are chosen to be searched.

As described above, in some embodiments, the partitions that correspond to bitsets whose bit corresponds to a query fragment identified in the received query are identified. In some embodiments, the bitsets corresponding to the partitions are generated using processes 300 and 350 of FIGS. 3A and 3B.

Example Query Fragment Generation

FIG. 7 illustrates an example embodiment of fragment generation. In this example, at 702, the query for the item "method not allowed" is broken down into the separate fragments of "method," not," and "allowed." At 704, the example "_sourcecategory=lsw_qa" can either be considered in its entirety as a query fragment, or it can be expanded to replace the "qa" portion with the wildcard "*" to produce the query fragment "_sourcecategory=lsw_*".

Example Use Case

The following is an example of query analysis and auto-partitioning for ACME, a customer of a data collection and analysis platform such as platform 100 of FIG. 1.

FIG. 8 illustrates an embodiment of a query speedup. In this example, an improvement (e.g., five times improvement) in speedup on error queries versus other queries is shown.

FIG. 9 illustrates an embodiment of query analysis results. In this example, an analysis of queries for a customer ("Acme") over a seven-day range is shown. In the example shown, while interactive queries made up ~0.5% of the total queries run, they account for 12.2% of the total cost for running the total number of queries. In some embodiments, an interactive query comprises a query run by a user (e.g., via a user interface provide by a terminal). Other examples of queries include batch queries (e.g., that are run in the background as a batch process). In some embodiments, the query analysis is determined using recorded query history information, as described above.

Figure 10:
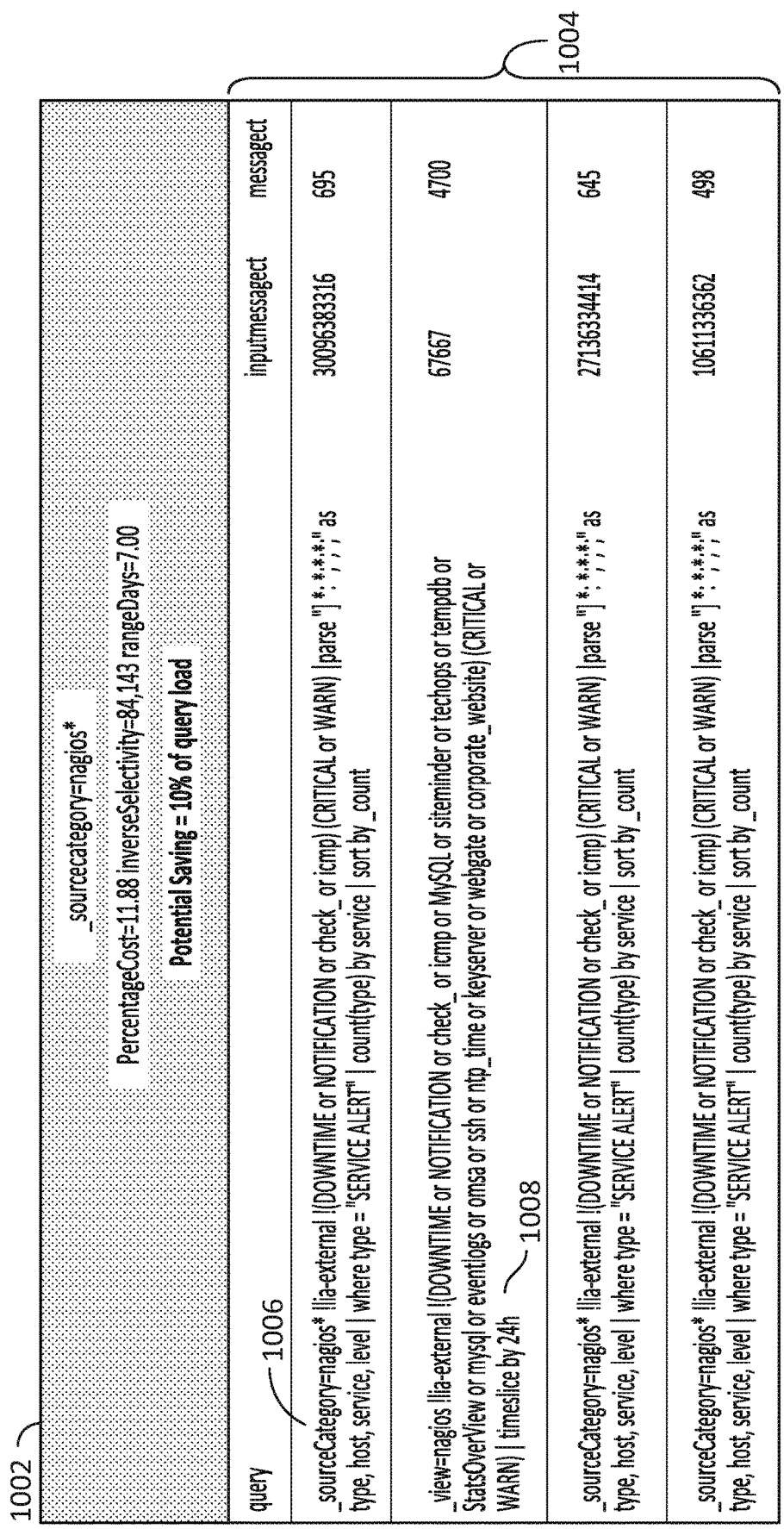
FIG. 10 illustrates an embodiment of query performance using auto-partitioning and query rewriting.

FIG. 10 illustrates an embodiment of query performance using auto-partitioning and query rewriting. In this example, a query fragment "_sourcecategory=nagios*" is shown at 1002. Query fragment 1002 has a percentage cost of 11.88, an inverse selectivity of 84,143, an associated range of days of 7.00, and a potential savings of 10% of the query load. At 1004 are various example queries and their corresponding input message counts and message counts.

In the example shown, by rewriting query 1006 to query 1008, the amount of messages that are scanned when processing/calculating the results of the query is significantly reduced, from 30096383316 to 67667. This results in an improvement to query performance/speed and can yield cost/resource savings.

FIG. 11 illustrates an example embodiment of a table indicating selectivity of search fragments. In some embodiments, the selectivity of a search fragment is based on the likelihood of the search/query fragment being repeated in logs. In some embodiments, selectivity of a query is determined based on a comparison of the number of messages in a query result and the number of messages in total (e.g., the ratio of the two numbers). As one example, suppose that there are 100,000 total messages. A first query returns only ten messages (relatively small number of messages). The first query is then determined as having high selectivity. If, for example, a second query results in 50,000 results being returned, then such a query is determined to be of low selectivity. The threshold for determining high versus low selectivity may be configurable. In some embodiments, a highly selective query fragment produces only a small number of results, where the term or combinations of terms in the query fragment occur only very few times in messages. In some embodiments, query fragments with high selectivity are selected or desired when generating partitions, as a partition will include only a few number of messages, making accessing the partition much faster. At column 1102, search fragments are shown. At column 1104, the range of days over which the search fragments are evaluated is shown. At column 1106, batch cost percentages for the search fragments are shown. At column 1108, interactive cost percentages for the search fragments are shown. At column 1110, inverse selectivities for the search fragments are shown. At column 1112, the number of times that a query (with the query fragment) is run is shown. At column 1114, percentage costs for the query fragments are shown. At column 1116, corresponding costs for the search/query fragments are shown.

Described herein are techniques for automatic partitioning. In some embodiments, historically observed queries are used to determine query fragments that are candidates for partitioning rules. In some embodiments, the efficiency of the candidates over an entire partition scheme is evaluated, for example, based on the historically observed performance prior to partitioning and an estimated performance based on modelling. Partitions are then generated based on the analysis.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method comprising:
generating candidate log partitions to be created based on previously run queries for selecting logs from log data, each log comprising log data collected from one or more computer systems during operation of the one or more computer systems, each candidate log partition associated with a condition to determine which logs are indexed in the candidate log partition after creating the candidate log partition;
for each candidate log partition, calculating a density of the candidate log partition based on a number of logs to be indexed in the candidate log partition, the calculating of the density comprising calculating a selectivity of the candidate log partition that indicates a likelihood that a combination of fragments from the run queries is repeated in the logs from the log data;
for each candidate log partition, calculating a cost of implementing the candidate log partition based on the density of the candidate log partition, the cost of implementing comprising a computation cost of building the candidate log partition, a computation cost of indexing log data based on the candidate log partition, and a computation cost of accessing the candidate log partition;
for each candidate log partition, calculating benefits of implementing the candidate log partition associated with improvements of query performance measures, the calculating of the benefits comprising:
determining a first benefit corresponding to an amount of computation work avoided by using the candidate log partition to retrieve results for a query; and
determining a second benefit by computing, based on at least the density of the candidate log partition and the cost of query rewriting, an improvement in a speed to perform a query;
selecting at least one candidate log partition based on the respective cost and the benefits of implementing each candidate log partition;
for each selected candidate log partition, creating the candidate log partition by indexing logs in the log data that meet the condition associated with the selected candidate log partition;
receiving a new query; and
selecting logs for responding to the new query utilizing available log partitions, the selecting of the logs comprising:
rewriting the new query based on the available log partitions;
retrieving the logs from the log data using the rewritten new query for accessing the available log partitions; and
presenting, in a user interface, information on the retrieved logs.

2. The method as recited in claim 1, wherein generating candidate log partitions based on previously run queries comprises:
identifying a frequency of query fragments found in the previously run queries.

3. The method as recited in claim 1, wherein calculating the density of the candidate log partition comprises:
accessing a sample of logs;
determining if each log would be included in the candidate log partition based on the condition of the candidate log partition; and
calculating the density based on a number of logs that would be included in the candidate log partition.

4. The method as recited in claim 1, wherein calculating the benefit of implementing the candidate log partition further comprises:
determining a likelihood that the query would use the candidate log partition;
determining a number of logs previously scanned to answer the query; and
determining, based on the number of previously scanned logs, an amount of computation work avoided to implement the query by utilizing the candidate log partition to retrieve results for the query.

5. The method as recited in claim 1, wherein creating the candidate log partition comprises:
automatically creating each selected candidate log partition without requiring user approval.

6. The method as recited in claim 1, wherein information stored for each previously run query comprises a text of the previously run query, time range for the previously run query, how long it took the previously run query to complete, how many logs were scanned for the previously run query, and a number of logs that matched the previously run query.

7. A system comprising:
a memory comprising instructions; and
one or more computer processors, wherein the instructions, when executed by the one or more computer processors, cause the system to perform operations comprising:
generating candidate log partitions to be created based on previously run queries for selecting logs from log data, each log comprising log data collected from one or more computer systems during operation of the one or more computer systems, each candidate log partition associated with a condition to determine which logs are indexed in the candidate log partition after creating the candidate log partition;
for each candidate log partition, calculating a density of the candidate log partition based on a number of logs to be indexed in the candidate log partition, the calculating of the density comprising calculating a selectivity of the candidate log partition that indicates a likelihood that a combination of fragments from the run queries is repeated in the logs from the log data;
for each candidate log partition, calculating a cost of implementing the candidate log partition based on the density of the candidate log partition, the cost of implementing comprising a computation cost of building the candidate log partition, a computation cost of indexing log data based on the candidate log partition, and a computation cost of accessing the candidate log partition;
for each candidate log partition, calculating benefits of implementing the candidate log partition associated with improvements of query performance measures, the calculating of the benefits comprising:
determining a first benefit corresponding to an amount of computation work avoided by using the candidate log partition to retrieve results for a query; and
determining a second benefit by computing, based on at least the density of the candidate log partition and the cost of query rewriting, an improvement in a search performance metric that indicates query performance for searches, the query performance corresponding to query speed;
selecting at least one candidate log partition based on the respective cost and the benefits of implementing each candidate log partition;

for each selected candidate log partition, creating the candidate log partition by indexing logs in the log data that meet the condition associated with the selected candidate log partition;

receiving a new query; and selecting logs for responding to the new query utilizing available log partitions, the selecting of the logs comprising:

rewriting the new query based on the available log partitions;

retrieving the logs from the log data using the rewritten new query for accessing the available log partitions; and presenting, in a user interface, information on the retrieved logs.

8. The system as recited in claim 7, wherein generating candidate log partitions based on previously run queries comprises:

identifying a frequency of query fragments found in the previously run queries.

9. The system as recited in claim 7, wherein calculating the density of the candidate log partition comprises:

accessing a sample of logs;

determining if each log would be included in the candidate log partition based on the condition of the candidate log partition; and calculating the density based on a number of logs that would be included in the candidate log partition.

10. A non-transitory machine-readable storage medium including instructions that, when executed by a machine, cause the machine to perform operations comprising:

generating candidate log partitions to be created based on previously run queries for selecting logs from log data, each log comprising log data collected from one or more computer systems during operation of the one or more computer systems, each candidate log partition associated with a condition to determine which logs are indexed in the candidate log partition after creating the candidate log partition;

for each candidate log partition, calculating a density of the candidate log partition based on a number of logs to be indexed in the candidate log partition, the calculating of the density comprising calculating a selectivity of the candidate log partition that indicates a likelihood that a combination of fragments from the run queries is repeated in the logs from the log data;

for each candidate log partition, calculating a cost of implementing the candidate log partition based on the density of the candidate log partition, the cost of implementing comprising a computation cost of building the candidate log partition, a computation cost of indexing log data based on the candidate log partition, and a computation cost of accessing the candidate log partition;

for each candidate log partition, calculating benefits of implementing the candidate log partition associated with improvements of query performance measures, the calculating of the benefits comprising:

determining a first benefit corresponding to an amount of computation work avoided by using the candidate log partition to retrieve results for a query; and determining a second benefit by computing, based on at least the density of the candidate log partition and the cost of query rewriting, an improvement in a speed to perform a query:

selecting at least one candidate log partition based on the respective cost and the benefits of implementing each candidate log partition;

for each selected candidate log partition, creating the candidate log partition by indexing logs in the log data that meet the condition associated with the selected candidate log partition;

receiving a new query; and selecting logs for responding to the new query utilizing available log partitions, the selecting of the logs comprising:

rewriting the new query based on the available log partitions;

retrieving the logs from the log data using the rewritten new query for accessing the available log partitions; and presenting, in a user interface, information on the retrieved logs.

11. The non-transitory machine-readable storage medium as recited in claim 10, wherein generating candidate log partitions based on previously run queries comprises:

identifying a frequency of query fragments found in the previously run queries.

12. The non-transitory machine-readable storage medium as recited in claim 10, wherein calculating the density of the candidate log partition comprises:

accessing a sample of logs;

determining if each log would be included in the candidate log partition based on the condition of the candidate log partition; and calculating the density based on a number of logs that would be included in the candidate log partition.

* * * * *